(12) United States Patent
Hu et al.

(10) Patent No.: US 8,978,485 B2
(45) Date of Patent: Mar. 17, 2015

(54) APPARATUS AND METHOD FOR INSPECTING RUBBING-CLOTH

(71) Applicants: Boe Technology Group Co., Ltd., Beijing (CN); Hefei Boe Optoelectronics Technology Co., Ltd., Hefei, Anhui (CN)

(72) Inventors: Yong Hu, Beijing (CN); Hongguang Guo, Beijing (CN); Jiancheng Wang, Beijing (CN); Duan Yang, Beijing (CN); Biao Wang, Beijing (CN); Long Zhang, Beijing (CN)

(73) Assignees: Boe Technology Group Co., Ltd., Beijing (CN); Hefei Boe Optoelectronics Technology Co., Ltd., Hefei, Anhui (CN)

( * ) Notice: Subject to any disclaimer, the term of this patent is extended or adjusted under 35 U.S.C. 154(b) by 128 days.

(21) Appl. No.: 13/703,662

(22) PCT Filed: Oct. 19, 2012

(86) PCT No.: PCT/CN2012/083238
§ 371 (c)(1),
(2) Date: Dec. 12, 2012

(87) PCT Pub. No.: WO2013/071808
PCT Pub. Date: May 23, 2013

(65) Prior Publication Data
US 2014/0083205 A1 Mar. 27, 2014

(30) Foreign Application Priority Data
Nov. 15, 2011 (CN) .......................... 2011 1 0362268

(51) Int. Cl.
*G01L 5/00* (2006.01)
*G01L 5/16* (2006.01)
*G02F 1/1337* (2006.01)

(52) U.S. Cl.
CPC ................ *G01L 5/16* (2013.01); *G02F 1/1337* (2013.01)

USPC .............. 73/862.55; 73/862.453; 73/862.451; 356/238.1

(58) Field of Classification Search
CPC ................................. G01L 5/16; G01F 1/1337
USPC ..................... 356/238.1, 238.3, 239.7, 237.1; 73/862.453, 826.451, 862.55
See application file for complete search history.

(56) References Cited

U.S. PATENT DOCUMENTS 4,969,609 A * 11/1990 Scheuter ..................... 73/862.55
5,130,559 A * 7/1992 Leifeld et al. .............. 356/238.3
(Continued)

FOREIGN PATENT DOCUMENTS

| CN | 1405635 A | 3/2003 |
|---|---|---|
| CN | 101097299 A | 1/2008 |

(Continued)

OTHER PUBLICATIONS

First Chinese Office Action dated Jul. 31, 2013; Appln. No. 201110362268.6.
(Continued)

*Primary Examiner* — Lisa Caputo
*Assistant Examiner* — Philip Cotey
(74) *Attorney, Agent, or Firm* — Ladas & Parry LLP

(57) ABSTRACT

An apparatus and method for inspecting a rubbing-cloth is provided. The apparatus for inspecting a rubbing-cloth includes: a base-platform provided with a pressure-sensing device on a surface thereof; a supporting-frame; a rubbing-roller, rotatably supported above the surface of the base-platform by means of the supporting-frame, with a rubbing-cloth wrapped around an outer circumference of the rubbing-roller; when the rubbing-roller is rotated, the rubbing-cloth rubs the surface of the base-platform, and the pressure-sensing device can detect pressure-sensing signals of pressure applied by the rubbing-cloth at each of detection-points on the surface of the base-platform.

12 Claims, 3 Drawing Sheets

(56) References Cited

U.S. PATENT DOCUMENTS

| | | |
|---|---|---|
| 5,663,510 A * | 9/1997 | Niemann et al. ............ 73/862.55 |
| 5,835,975 A * | 11/1998 | Peeters et al. ............... 73/862.55 |
| 2002/0005067 A1* | 1/2002 | Ingvarsson et al. ........ 73/862.55 |
| 2002/0092365 A1* | 7/2002 | Perenon et al. ........... 73/862.453 |
| 2003/0084726 A1 | 5/2003 | Yamazaki et al. |
| 2005/0000303 A1* | 1/2005 | Moore et al. ............... 73/862.55 |
| 2006/0037389 A1* | 2/2006 | Jorkama .................. 73/862.451 |
| 2006/0090574 A1* | 5/2006 | Moore et al. ............... 73/862.55 |
| 2008/0002196 A1 | 1/2008 | Yoo |
| 2008/0264184 A1* | 10/2008 | Moore et al. ............... 73/862.55 |
| 2009/0320612 A1* | 12/2009 | Moore et al. ............... 73/862.55 |
| 2010/0071480 A1* | 3/2010 | Pietikainen et al. ........ 73/862.55 |
| 2011/0226070 A1* | 9/2011 | Berendes et al. .......... 73/862.55 |

FOREIGN PATENT DOCUMENTS

| | | |
|---|---|---|
| CN | 102236212 A | 11/2011 |
| CN | 102707497 A | 10/2012 |
| KR | 20080049549 A | 6/2008 |
| KR | 20080049550 A | 6/2008 |

OTHER PUBLICATIONS

International Search Report mailed Jan. 24, 2013; PCT/CN2012/083238.

International Preliminary Report on Patentability dated May 20, 2014; PCT/CN2012/083238.

* cited by examiner

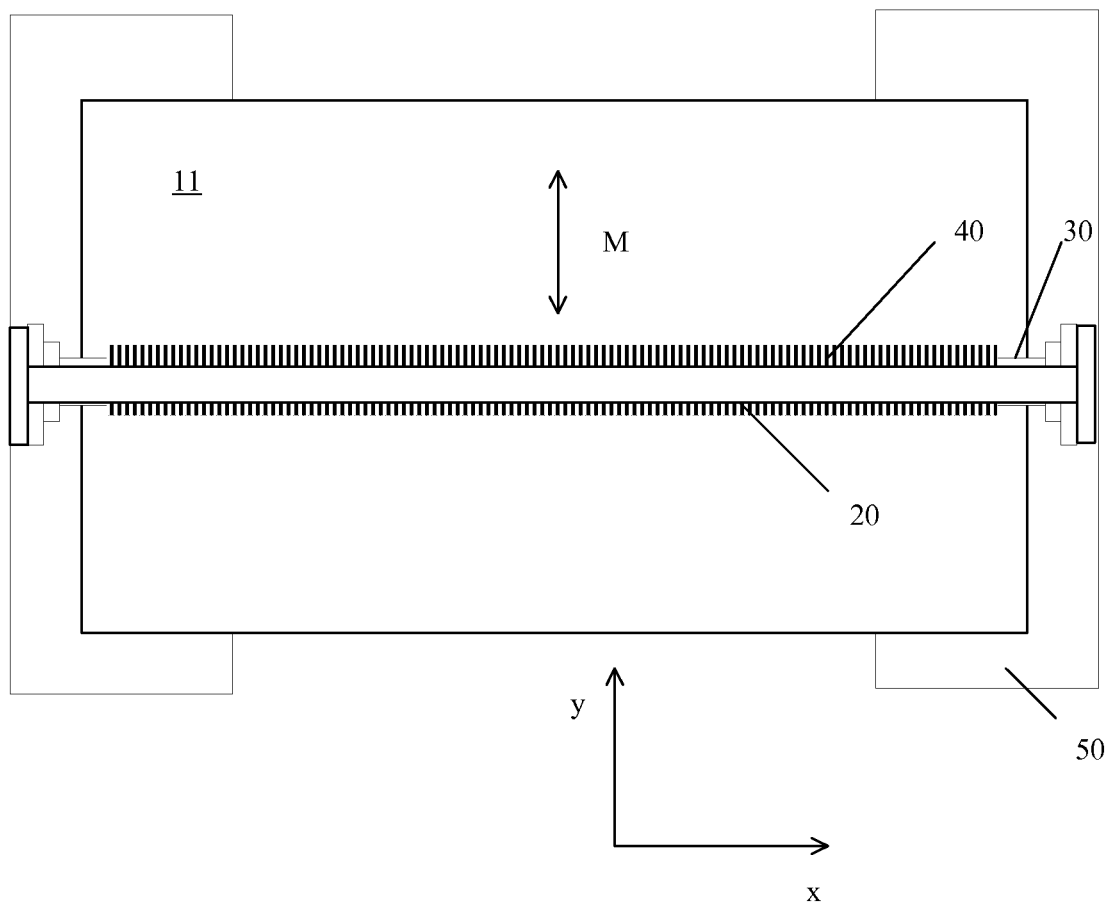
Fig.1-a

APPARATUS AND METHOD FOR INSPECTING RUBBING-CLOTH

TECHNICAL FIELD

The present disclosure relates to the field of liquid crystal display manufacture, and particularly relates to an apparatus and a method for inspecting a rubbing-cloth.

BACKGROUND

In liquid crystal display manufacturing techniques, a rubbing process is usually adopted to perform a pre-treatment for alignment of liquid crystal molecules. The rubbing process mainly comprises: a substrate coated with a polyimide (PI) film (also known as an alignment film) is placed on a bearing platform; a rubbing-roller wrapped in advance with a rubbing-cloth on its surface is rolled above the bearing platform at a preset rotational speed, thus drives the rubbing-cloth to roll on and across the surface of the alignment film on the substrate with a certain pressure; during the rolling process of the rubbing-cloth, the piles of the surface of the rubbing-cloth interact with the surface of the alignment film, so that grooves are formed on the alignment film. After the completion of the rubbing process, the substrate is cell-assembled with another substrate; and, liquid crystal (LC) molecules are injected between the two substrates. Because anchoring energy exists between the LC molecules and the alignment film, the LC molecules can be aligned in sequence along the grooves, so that the arrangement of the LC molecules within the alignment film meets the requirement of a pretilt angle.

During the rubbing process, the quality of the rubbing effect directly determines the uniformity of the oriental arrangement of liquid crystal molecules, thereby affecting the image display quality of a liquid crystal display. When the surface of the rubbing-cloth has defects, such as unevenness in thickness of the rubbing-cloth, foreign matter adhered to the surface of the rubbing-cloth, and impurities introduced in the weaving and dying processes of the rubbing-cloth, these defects may affect the uniformity of the rubbing-alignment at the corresponding positions, and thereby affecting the alignment properties.

In the prior art, a method for inspecting the quality of a rubbing-cloth is conducted as follows: rubbing an indium-tin oxide (ITO) glass coated with PI, and then using a steam inspection apparatus to perform visual inspection of the rubbing traces on the surface of the ITO glass after rubbing. With such a method, the surface condition of the rubbing-cloth can only be roughly exhibited, and the detected defective points on the rubbing-cloth can not be directly corresponded with the rubbing-cloth, and differences exist in the inspecting results due to different inspectors; moreover it is possible that judgment to the surface condition of the rubbing-cloth is affected due to the surface condition of the ITO glass.

SUMMARY

The technical problem to be solved by the present disclosure is to provide an apparatus and method for inspecting a rubbing-cloth, which improve the accuracy of inspecting a defect on the surface of the rubbing-cloth.

According to an embodiment of the present disclosure, there is provided an apparatus for inspecting a rubbing-cloth, and the apparatus comprises: a base-platform, provided with a pressure-sensing device on a surface thereof; a supporting-frame; a rubbing-roller, rotatably supported above the surface of the base-platform by means of the supporting-frame, with a rubbing-cloth wrapped around an outer circumference of the rubbing-roller; when the rubbing-roller is rotated, the rubbing-cloth rubs the surface of the base-platform, and the pressure-sensing device is capable of detecting pressure-sensing signals of pressure applied by the rubbing-cloth at each of detection-points on the surface of the base-platform.

Preferably, when the rubbing-roller is rotated, the supporting-frame is adapted to move perpendicular to an axial direction of the rubbing-roller and parallel to the surface of base-platform, so that the locations of the respective detection-points on the surface of the base-platform are in one-to-one correspondence with the locations of points on the rubbing-cloth.

Preferably, the rubbing-roller is adapted to move in a direction perpendicular to the surface of the base-platform by means of the supporting-frame.

The apparatus for inspecting a rubbing-cloth may further comprise: a signal processing device, adapted to convert the pressure-sensing signals at the respective detection-points on the surface of the base-platform into pressure values at the respective detection-points, and based on the distribution of the pressure values of the respective detection-points, to determine a defective point of the rubbing-cloth.

According to some embodiments, the signal processing device calculates an average value of the pressure values of all the detection-points, and based on a difference value between the average value and the pressure value of each of the detection-points, determines a defective point of the rubbing-cloth.

The signal processing device may further be used to output the pressure values of the respective detection-points to a display device for display.

Preferably, the pressure-sensing device is a sensor-network formed with a piezoelectric material.

The piezoelectric material may be ammonium dihydrogen phosphate.

The apparatus for inspecting a rubbing-cloth may further comprise: a control device, adapted to control a moving speed of the supporting-frame, a rotating speed of the rubbing-roller, and a distance between the rubbing-roller and the surface of the base-platform.

According to an embodiment of the present disclosure, there is also provided a method for inspecting a rubbing-cloth, and the method comprises: wrapping a rubbing-cloth around an outer circumference of the rubbing-roller; rotating the rubbing-roller to allow the rubbing-cloth to rub the surface of the base-platform, with the surface of the base-platform being provided with a pressure-sensing device; and obtaining pressure-sensing signals detected by the pressure-sensing device and indicating pressure applied by the rubbing-cloth at the respective detection-points on the surface of the base-platform.

Preferably, when the rubbing-roller is rotated, the supporting-frame is moved perpendicular to an axial direction of the rubbing-roller and parallel to the surface of the base-platform, so that the locations of the respective detection-points on the surface of the base-platform are in one-to-one correspondence with the locations of points on the rubbing-cloth.

The method for inspecting a rubbing-cloth may further comprise: converting the pressure-sensing signals at the respective detection-points on the surface of the base-platform into pressure values, and based on the distribution of the pressure values of the respective detection-points, determining a defective point of the rubbing-cloth.

The method for inspecting a rubbing-cloth may further comprise: after converting the pressure-sensing signals at the respective detection-points on the surface of the base-platform into pressure values, outputting the pressure values to a display device for display.

Preferably, the method for inspecting a rubbing-cloth further comprise: before starting to rotate the rubbing-roller, adjusting a distance between the rubbing-roller and the surface of the base-platform.

BRIEF DESCRIPTION OF THE DRAWINGS

In order to make objects, technical details and advantages of the present disclosure apparent, the present disclosure will be described in detail in connection with specific embodiments and accompanying drawings, in which:

FIG. 1-a is a top view of the apparatus for inspecting a rubbing-cloth of FIG.1.

DETAILED DESCRIPTION

An embodiment of the present disclosure provides a pressure-sensing type of apparatus and method for inspecting a rubbing-cloth, in which, when the rubbing-cloth rubs on and across a pressure-sensing base-platform used for inspecting, the pressure-sensing base-platform can detect pressure-sensing signals, and with converting and analyzing the pressure-sensing signals, a defect on the rubbing-cloth can be determined. This improves the accuracy of inspecting a defect on the surface of the rubbing-cloth. Further, a distribution of the pressure values of the respective detection-points can be displayed in real-time in a display device, and thus a real-time inspection of defects on the surface of the rubbing-cloth can be achieved.

Figure 1:
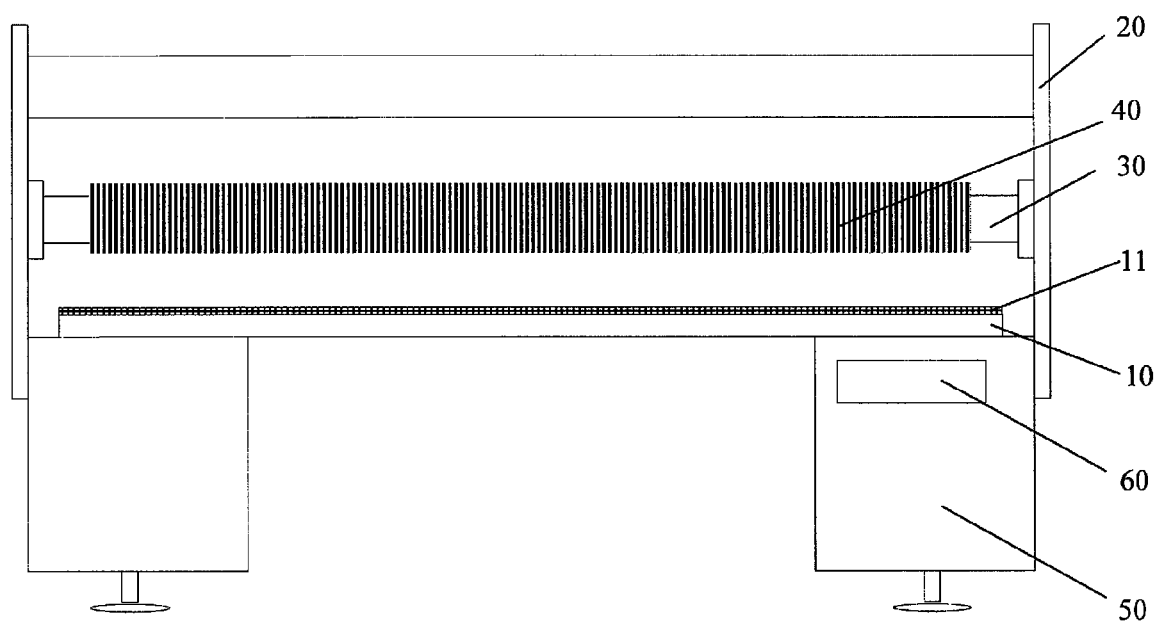
FIG. 1 is a schematic structural diagram of an apparatus for inspecting a rubbing-cloth in accordance with an embodiment of the present disclosure.

With reference to FIG. 1, the apparatus for inspecting a rubbing-cloth in accordance with an embodiment of the present disclosure may comprise:

A base-platform 10, provided with a pressure-sensing device 11 on a surface of the base-platform 10;

A supporting-frame 20, disposed across the base-platform 10;

A rubbing-roller 30, rotatably mounted on the supporting-frame 20, with a rubbing-cloth 40 wrapped around the outer circumference of the rubbing-roller 30. When the rubbing-roller 30 is rotated, the rubbing-cloth 40 rubs the surface of the base-platform 10, and the pressure-sensing device 11 can detect pressure-sensing signals of pressure applied by the rubbing-cloth 40 at each of detection-points on the surface of the base-platform.

In some examples, the rubbing-roller 30 can be moved along the supporting-frame 20 up and down, i.e., along a direction perpendicular to the surface of the base-platform, so as to adjust a distance between the rubbing-roller 30 and the surface of the base-platform.

After detecting the pressure-sensing signals, the pressure-sensing device 11 can output the pressure-sensing signals to a signal processing device (not shown) for processing. The signal processing device may be provided within the rubbing-cloth inspection apparatus, also may be provided separately from the rubbing-cloth inspection apparatus. The signal processing device can convert the pressure-sensing signals at the respective detection-points on the surface of the base-platform 10 into pressure values, and based on the distribution of the pressure values of the respective detection-points, determine a defective point of the rubbing-cloth.

Specifically, the signal processing device can calculate an average value of the pressure values of all the detection-points at first, and then for each of the detection-points, calculate a difference value between the average value and the pressure value of that detection-point; if the difference value is greater than a predetermined threshold value, then that detection-point can be determined as being abnormal, and the coordinates of that abnormal point are output.

In the embodiment as illustrated, as shown in FIG. 1-a, the supporting-frame 20 is configured to be able to move perpendicular to an axial direction (x direction) of the rubbing-roller 30 and parallel to the surface of base-platform 10 (which is in the x-y plane as shown in the figure) when the rubbing-roller 30 is rotated, so that the locations of the respective detection-points on the surface of the base-platform 10 are in one-to-one correspondence with the locations of the respective points on the rubbing-cloth 40. Such movement of the supporting-frame 20 is indicated with "M" in FIG. 1-a. Since the locations of the detection-points are in one-to-one correspondence with the locations of the points on the rubbing-cloth, a point on the rubbing-cloth which corresponds to the abnormal detection-point is exactly a defective point on the rubbing-cloth.

It should be noted that, embodiments of the present disclosure are not limited to such configuration in which the supporting-frame 20 is moved parallel to the surface of the base-platform 10 when the rubbing-roller 30 is rotated. For example, in the case that the supporting-frame 20 is configured to move unparallel to the surface of the base-platform, the pressure-sensing signals expanded along a time-axis, which are detected by the pressure-sensing device 11 at a same detection-point, correspond to the respective points of the rubbing-cloth 40 along the circumference of the rubbing-roller 30. Thus, through an analysis of the variation of the pressure-sensing signals with time at each of the detection-points, a defective point on the rubbing-cloth which corresponds to an abnormal detection-point can be determined.

Further, after obtaining the pressure values of the respective detection-points, the signal processing device can further directly output the pressure values to a display device for display. In the display device, the display coordinates are in correspondence with the coordinates of the respective points on the rubbing-cloth, the display result of the pressure values of the respective points can be presented in different colors or in different grey scales, based on the ranges of the magnitudes of the pressure values, so that a point in the displayed image which has an abnormal grey scale or an abnormal color exactly corresponds to a defective point of the rubbing-cloth.

In the above-described apparatus for inspection a rubbing-cloth, the pressure-sensing device 11 may be a sensor-network formed with a piezoelectric material, and the piezoelectric material may be ammonium dihydrogen phosphate or other piezoelectric materials well-known in the art. In addition, the pressure-sensing device 11 also may be other apparatus as well-known which can obtain pressure-sensing signals.

In a specific implementation, the base-platform 10 can be placed on a bearing-structure 50, and the supporting-frame 20 may be a gantry framework; and the gantry framework can be driven by a first transmission mechanism provided in the rubbing-cloth inspection apparatus, and can be moved in a direction parallel to the surface of the base-platform 10 by means of a guide-rail provided on the bearing-structure 50.

The above-described apparatus for inspecting a rubbing-cloth may further comprise a second transmission mechanism and a third transmission mechanism. With the second transmission mechanism driving the rubbing-roller 30 to rotate and the third transmission mechanism driving the rubbing-roller 30 to move along the supporting-frame 20 up and down, the rubbing-roller 30 is enabled to contact the surface of the base-platform 10, so that when the rubbing-roller 30 is rotated, the rubbing-cloth 40 wrapped around the outer circumference of the rubbing-roller rubs the surface of the base-platform 10 and generates pressure.

The above-described apparatus for inspecting a rubbing-cloth may further comprise a control device, and the control device can receive an input or setting by a user, and based on the input or setting, control the moving speed of the supporting-frame 20 (by controlling the first transmission mechanism), the rotating speed of the rubbing-roller 30 (by controlling the second transmission mechanism), as well as the distance between the rubbing-roller 30 and the surface of the base-platform 10 (by controlling the third transmission mechanism). In a specific implementation, a parameter-setting panel 60 may be provided in the rubbing-cloth inspection apparatus, thus the parameter-setting panel 60 is utilized to obtain the user's settings, and output the user's settings to the control device.

Figure 2:
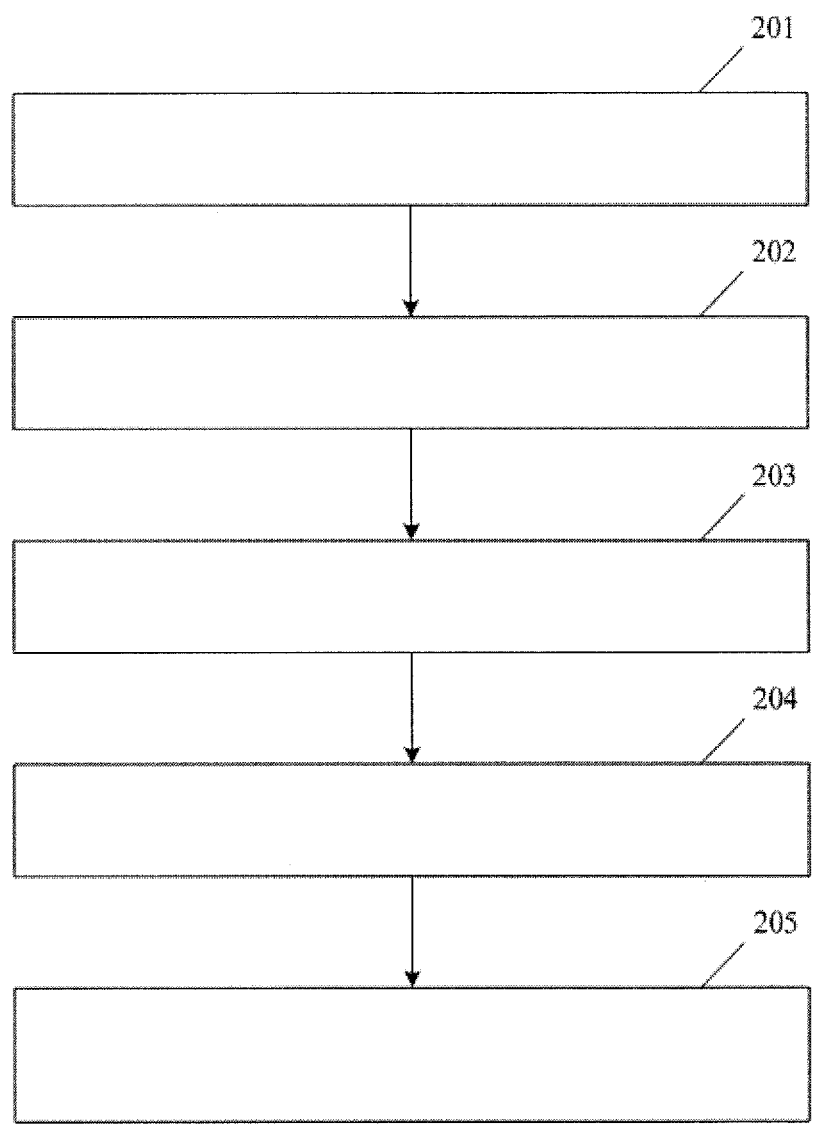
FIG. 2 is a schematic flowchart of a method for inspecting a rubbing-cloth in accordance with an embodiment of the present disclosure.

Below, with reference to FIG. 2, an operating method of the apparatus for inspecting a rubbing-cloth in accordance with the embodiment of the present disclosure will be described, and the operating method comprises the following steps:

Step 201, wrapping the rubbing-cloth around the outer circumference of the rubbing-roller, and fixing the rubbing-roller on the supporting-frame;

Step 202, during rubbing process, with the parameter-setting panel, setting the distance between the rubbing-roller and the surface of the base-platform, the rotating speed of the rubbing-roller, and the moving speed of the supporting-frame with respect to the base-platform, for example, as 0.45 mm, 1200 RPM, 50 mm/s, respectively;

Step 203, rotating the rubbing-roller, so that the rubbing-cloth rubs the surface of the base-platform provided thereon with a pressure-sensing device; and moving the supporting-frame perpendicular to an axial direction of the rubbing-roll and parallel to the surface of the base-platform;

Step 204, with the pressure-sensing device, detecting pressure-sensing signals and outputting the pressure-sensing signals to a signal processing device; and Step 205, with the signal processing device, converting the pressure-sensing signals at the respective detection points on the surface of the base-platform into pressure values, and based on the distribution of the pressure values of the respective detection points, determining a defective point of the rubbing-cloth.

Specifically, the signal processing device can calculate an average value of the pressure values of all the detection-points at first, and then for each of the detection-points, calculate a difference value between the average value and the pressure value of that detection-point; if the difference value is greater than a predetermined threshold value, then that detection-point can be determined as being abnormal, and the coordinates of that abnormal point are output.

In the illustrated example, when the rubbing-roller is rotated, the supporting-frame is moved perpendicular to an axial direction of the rubbing-roller and parallel to the surface of the base-platform, so that the locations of the respective detection-points on the surface of the base-platform are in one-to-one correspondence with the locations of the points on the rubbing-cloth. Since the locations of the detection-points are in one-to-one correspondence with the locations of the points on the rubbing-cloth, a point on the rubbing-cloth which corresponds to the abnormal detection-point is exactly a defective point on the rubbing-cloth.

It should be noted that, embodiments of the present disclosure are not limited to the case that the supporting-frame is moved perpendicular to an axial direction of the rubbing-roller and parallel to the surface of the base-platform when the rubbing-roller is rotated. For example, in the case that the supporting-frame 20 is moved unparallel to the surface of the base-platform, the pressure-sensing signals expanded along a time-axis, which are detected by the pressure-sensing device at a same detection-point, correspond to the respective points of the rubbing-cloth along the circumference of the rubbing-roller. Thus, through an analysis of the variation of the pressure-sensing signals with time at each of the detection-points, a defective point on the rubbing-cloth which corresponds to an abnormal detection-point can be determined.

Further, after obtaining the pressure values of the respective detection-points, the signal processing device also can directly output the pressure values to a display device for display. In the display device, the display coordinates are in correspondence with the coordinates of the respective points on the rubbing-cloth, the display result of the pressure values of the respective points can be presented in different colors or in different grey scales, based on the ranges of the magnitudes of the pressure values, so that a point in the displayed image which has an abnormal grey scale or an abnormal color exactly corresponds to a defective point of the rubbing-cloth.

In the embodiment of the present disclosure, a pressure-sensing approach is adopted to inspect a defect on the surface of a rubbing-cloth. Since a point having an abnormal pressure value corresponds to a defect on the surface of the rubbing-cloth, an accurate inspection of the defects on the surface of the rubbing-cloth can be achieved. In addition, since there is no need to use inspecting-materials such as a PI solution and an ITO glass, the impact of the material variations on the inspecting results is reduced, and the inspecting costs can be saved.

Finally, it should be noted that, the above embodiments are only used to explain the technical solutions of the present disclosure, instead of limitation. The ordinary skilled in the art should understand that, modifications or equivalent replacements can be made to the technical solutions disclosed herein without departing from the spirit and scope of the disclosed technical solutions, which also should be included within the scope of the claims of the present disclosure.

The invention claimed is:

1. An apparatus for inspecting a rubbing-cloth comprising:
 a base-platform, provided with a pressure-sensing device on a surface thereof;
 a supporting-frame; and
 a rubbing-roller, for a rubbing-cloth to be wrapped around an outer circumference of the rubbing-roller, rotatably supported above the surface of the base-platform by means of the supporting-frame;
 wherein the pressure-sensing device is configured to detect pressure-sensing signals of pressure applied by the rubbing-cloth at each of detection-points on the surface of the base-platform when the rubbing-roller is rotated and the rubbing-cloth rubs the surface of the base-platform; and
 wherein the apparatus further comprises: a signal processing device, configured to convert the pressure-sensing signals at the respective detection-points on the surface of the base-platform into pressure values at the respective detection-points, and based on the distribution of the pressure values of the respective detection-points, to determine a defective point of the rubbing-cloth, wherein the signal processing device calculates an average value of the pressure values of all the detection-points, and based on a difference value between the average value and the pressure value of each of the detection-points, determines a defective point of the rubbing-cloth.

2. The apparatus for inspecting a rubbing-cloth according to claim 1, wherein when the rubbing-roller is rotated, the supporting-frame is configured to move perpendicular to an axial direction of the rubbing-roller and parallel to the surface of base-platform, so that the locations of the respective detection-points on the surface of the base-platform are in one-to-one correspondence with the locations of points on the rubbing-cloth.

3. The apparatus for inspecting a rubbing-cloth according to claim 1, wherein
the rubbing-roller is configured to move in a direction perpendicular to the surface of the base-platform by means of the supporting-frame.

4. The apparatus for inspecting a rubbing-cloth according to claim 1, wherein the signal processing device is also configured to output the pressure values of the respective detection-points to a display device for display.

5. The apparatus for inspecting a rubbing-cloth according to claim 1, further comprising:
a signal processing device, configured to convert the pressure-sensing signals at the respective detection-points on the surface of the base-platform into pressure values, and thereafter output the pressure values to a display device for display.

6. The apparatus for inspecting a rubbing-cloth according to claim 1, wherein the pressure-sensing device is a sensor-network formed with a piezoelectric material.

7. The apparatus for inspecting a rubbing-cloth according to claim 6, wherein the piezoelectric material is ammonium dihydrogen phosphate.

8. The apparatus for inspecting a rubbing-cloth according to claim 1, further comprising:
a control device, configured to control a moving speed of the supporting-frame, a rotating speed of the rubbing-roller, and a distance between the rubbing-roller and the surface of the base-platform.

9. A method for inspecting a rubbing-cloth, comprising:
wrapping a rubbing-cloth around an outer circumference of a rubbing-roller;
rotating the rubbing-roller to allow the rubbing-cloth to rub the surface of a base-platform, with the surface of the base-platform being provided with a pressure-sensing device; and
obtaining pressure-sensing signals detected by the pressure-sensing device and indicating pressure applied by the rubbing-cloth at the respective detection-points on the surface of the base-platform,
wherein the method further comprises: converting the pressure-sensing signals at the respective detection-points on the surface of the base-platform into pressure values, and based on the distribution of the pressure values of the respective detection-points, determining a defective point of the rubbing-cloth,
wherein an average value of the pressure values of all the detection-points is calculated, and based on a difference value between the average value and the pressure value of each of the detection-points, a defective point of the rubbing-cloth is determined.

10. The method for inspecting a rubbing-cloth according to claim 9, wherein when the rubbing-roller is rotated, the supporting-frame is moved perpendicular to an axial direction of the rubbing-roller and parallel to the surface of the base-platform, so that the locations of the respective detection-points on the surface of the base-platform are in one-to-one correspondence with the locations of points on the rubbing-cloth.

11. The method for inspecting a rubbing-cloth according to claim 9, further comprising:
after converting the pressure-sensing signals at the respective detection-points on the surface of the base-platform into pressure values, outputting the pressure values to a display device for display.

12. The method for inspecting a rubbing-cloth according to claim 9, further comprising:
before starting to rotate the rubbing-roller, adjusting a distance between the rubbing-roller and the surface of the base-platform.

* * * * *